Feb. 22, 1949. G. FOX 2,462,484
SKIP HOIST CONTROL
Filed Dec. 29, 1944 9 Sheets-Sheet 1

INVENTOR.
Gordon Fox
BY
Wilkinson, Huxley, Byron & Knight
Att'ys

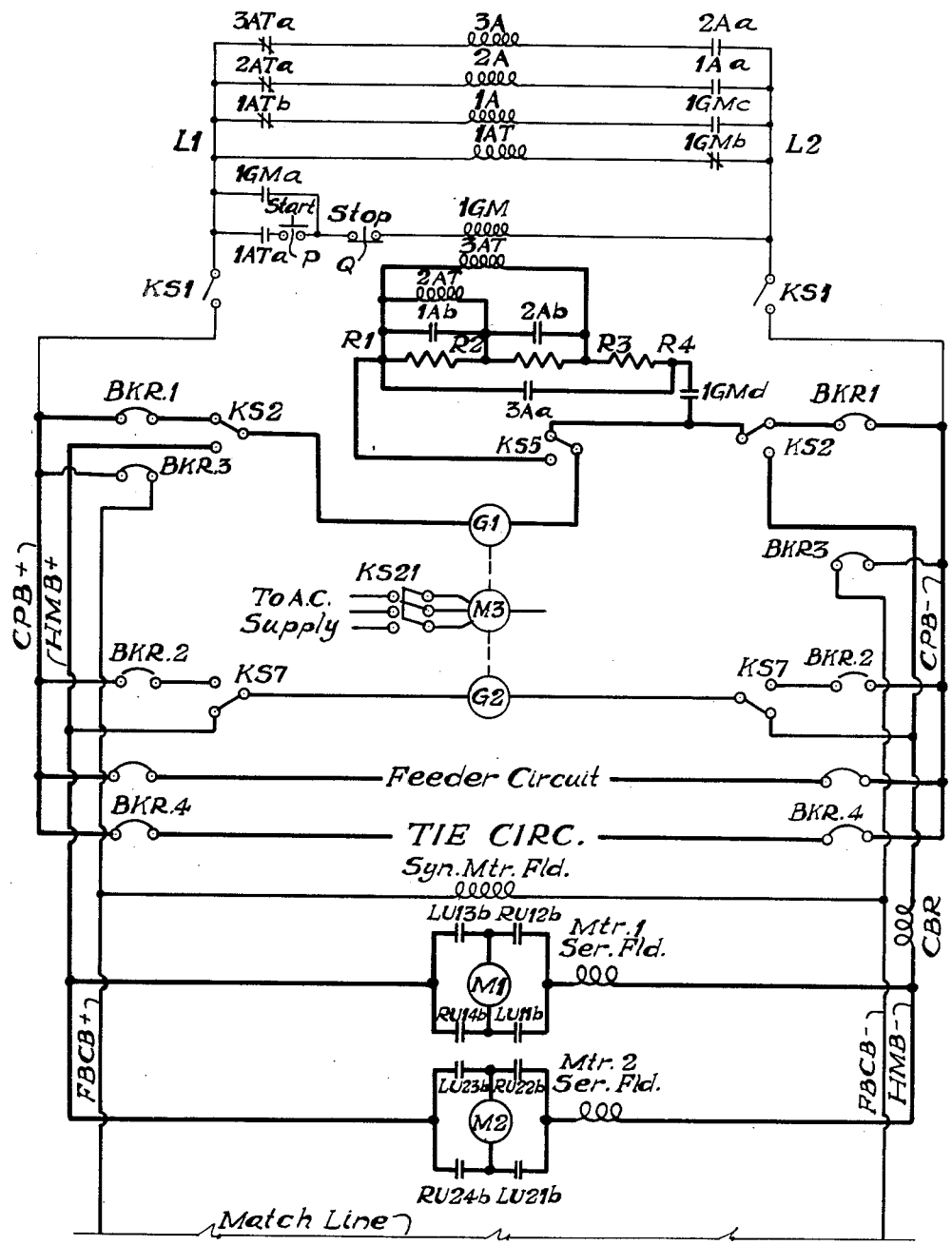
Fig. 2 - Part A

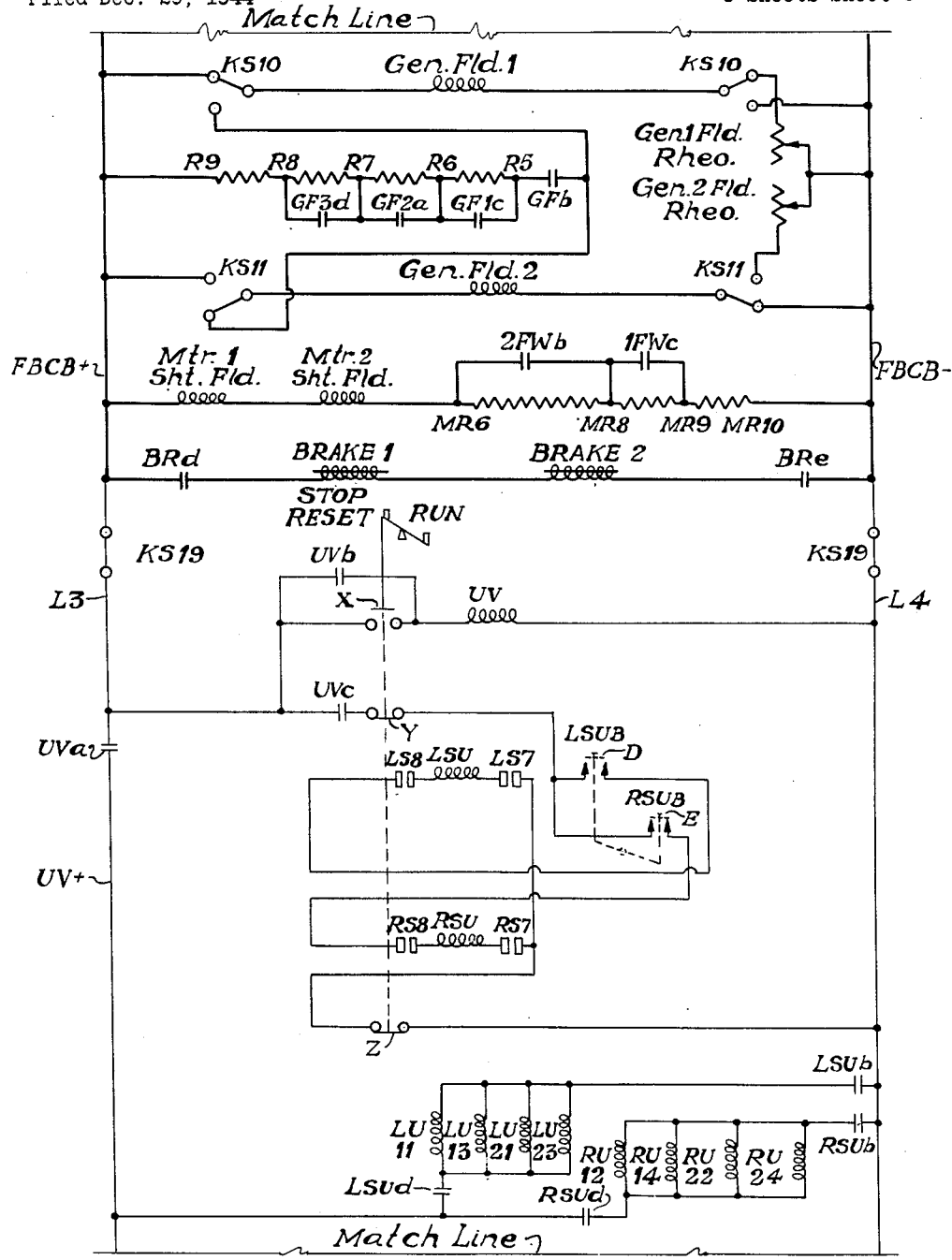
Fig. 2 - Part B
INVENTOR.
Gordon Fox

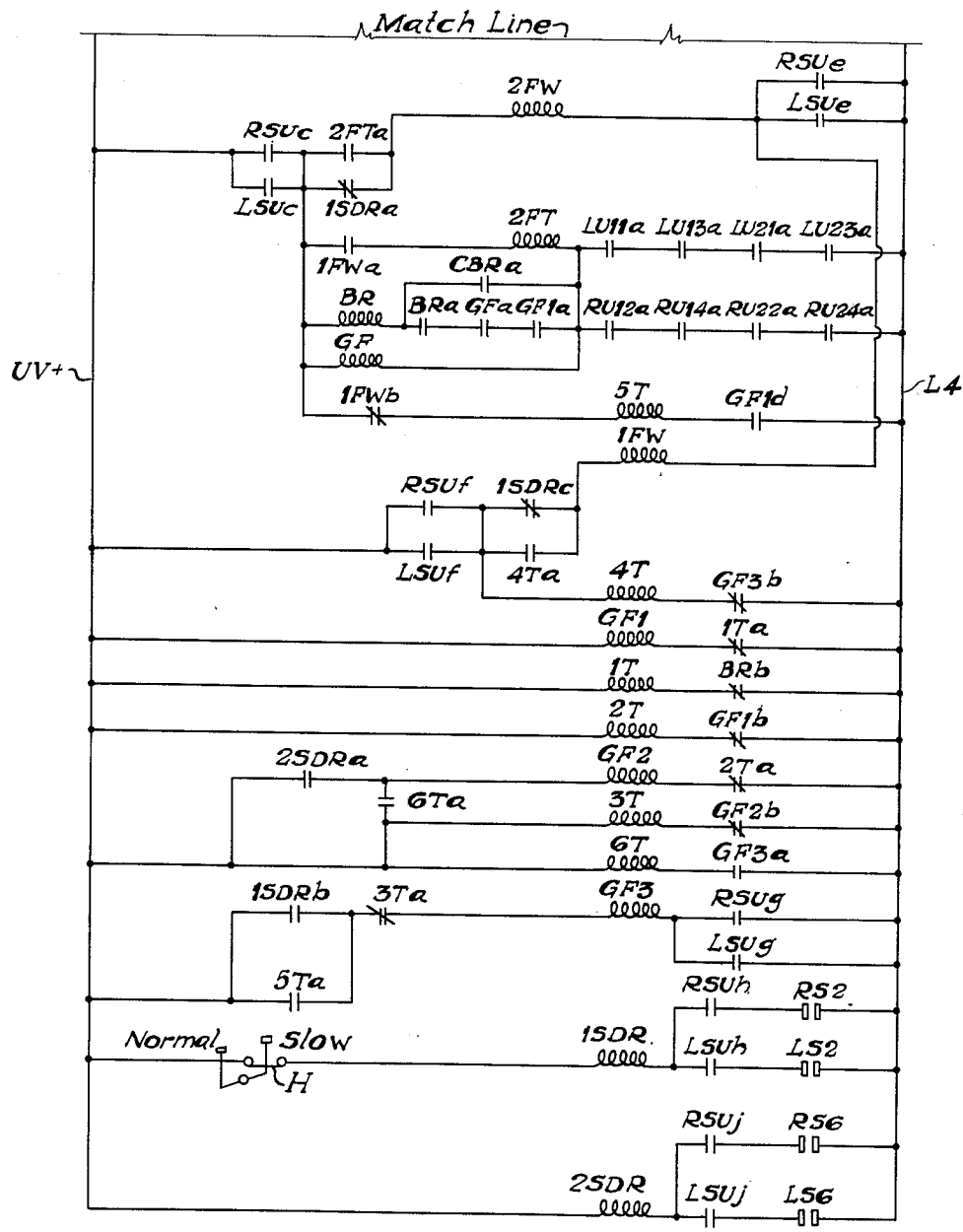
Fig. 2-Part C

Feb. 22, 1949.　　　　G. FOX　　　　2,462,484
SKIP HOIST CONTROL
Filed Dec. 29, 1944　　　　　　　　9 Sheets-Sheet 5
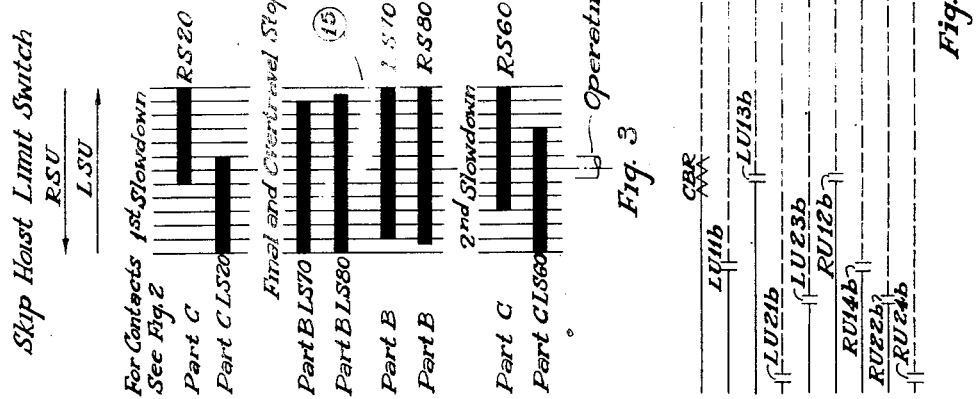
INVENTOR.
Gordon Fox
BY
ATTORNEYS

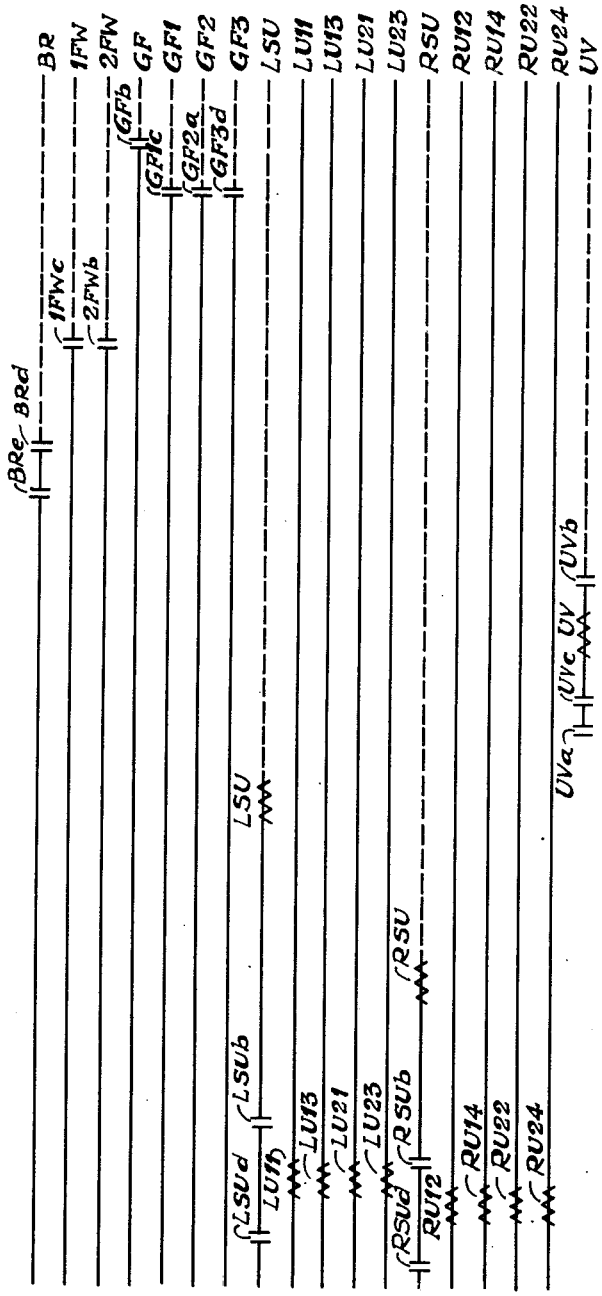
Fig. 2. Part B-1

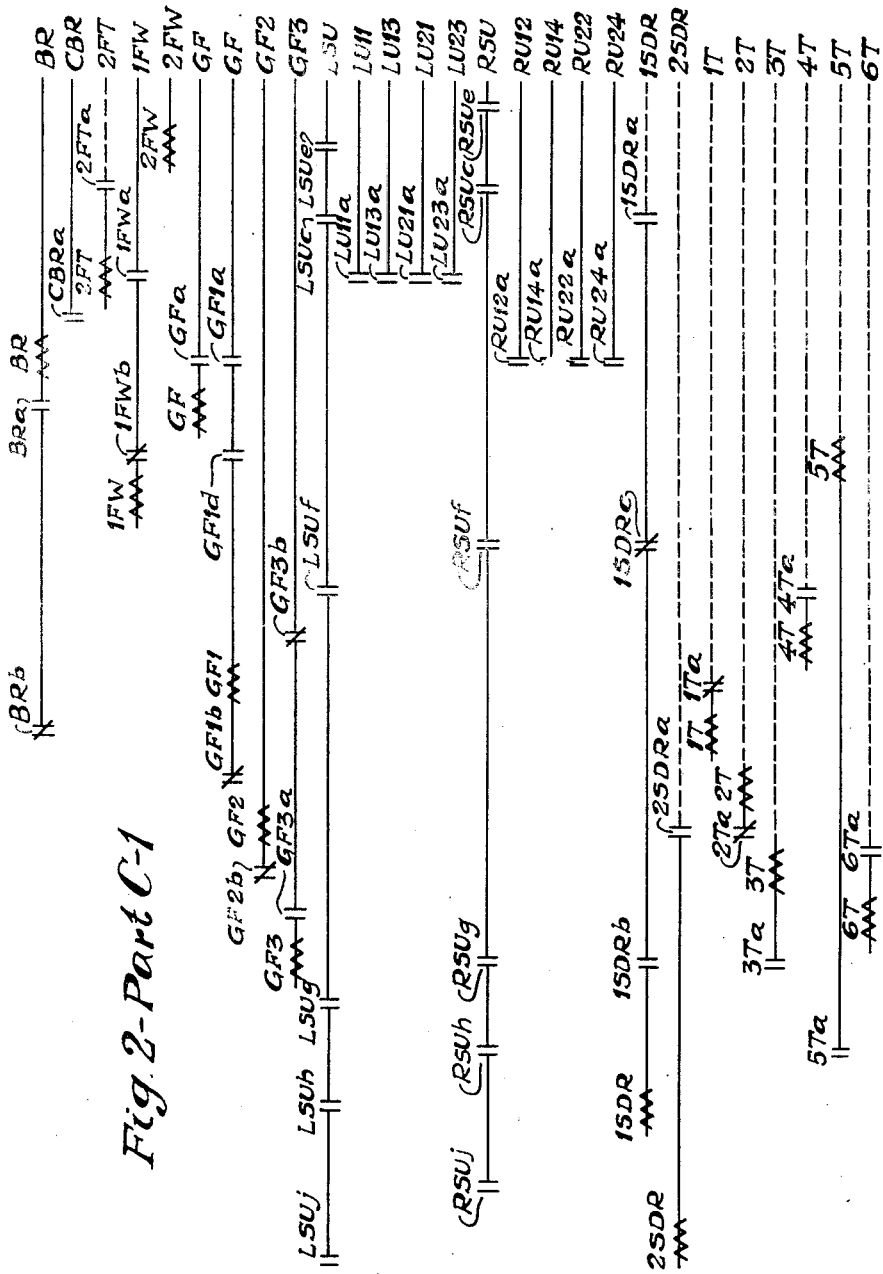
Fig. 2-Part C-1

Feb. 22, 1949. G. FOX 2,462,484
SKIP HOIST CONTROL
Filed Dec. 29, 1944 9 Sheets-Sheet 8

INVENTOR.
Gordon Fox
BY
Wilkinson Huxley Byron Knight
Attys

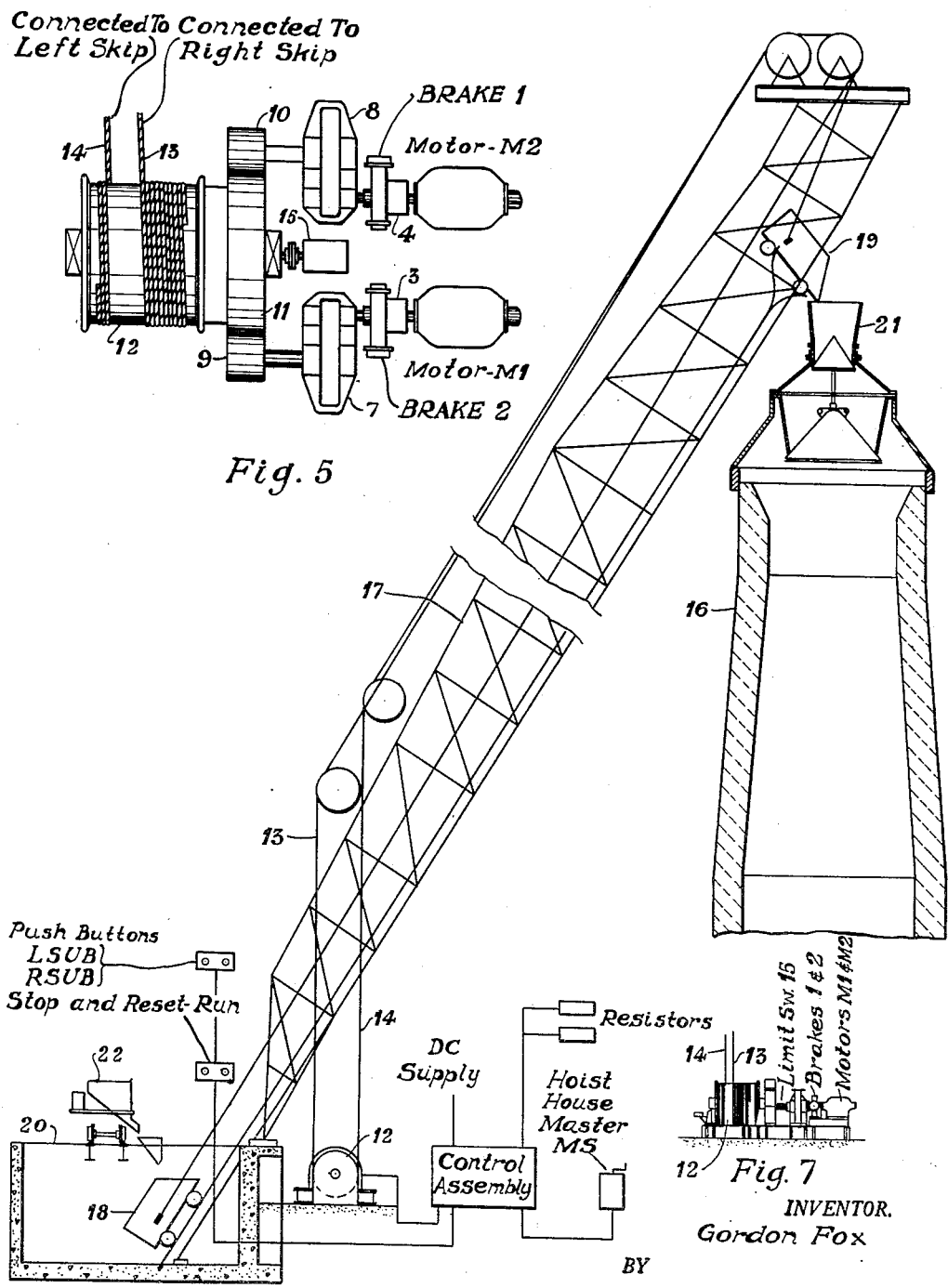

UNITED STATES PATENT OFFICE 2,462,484

SKIP HOIST CONTROL

Gordon Fox, Chicago, Ill., assignor to Freyn Engineering Company, Chicago, Ill., a corporation of Maine Application December 29, 1944, Serial No. 570,310

19 Claims. (Cl. 254—173)

The present invention relates to improvements in skip hoist controls.

More particularly the present invention relates to improvements in mechanism for controlling the motors of a skip hoist such as used in the charging of a blast furnace. According to preferred practice, skip hoists for blast furnaces involve two skips, one being used to haul material to the top of the furnace while the other is descending to the skip pit. It is preferred practice to provide the hoist with a drive having two motors. The mechanical features of a two-motor drive for a skip hoist are described and claimed in the application of Fox, Callow and Bigelow, filed February 23, 1942, Serial No. 432,060, now Patent No. 2,345,662, dated April 4, 1944.

In the application filed by the present applicant on December 11, 1942, Serial No. 468,698, now Patent No. 2,379,958, dated July 10, 1945, it was pointed out that a dominating factor determining the size of the hoist motors is the torque required in starting and accelerating. The torque demanded during this period, at the time when one of the skips is at the furnace top (therefore not providing counterbalance), is about twice as great as the torque required under full speed running conditions. In the Fox application Serial No. 468,698 referred to, a drive was described using series-parallel control for the lower portion of the speed range and shunt field control of the hoist motors for the upper portion of the speed range. This combination affords basically a very large torque production per ampere at low speeds and diminishing torque capacity at high speeds. It permits the use of higher gear ratios, and it employs motor capacity more effectively than conventional drives having the same torque capacity at all speeds.

The application filed by the present applicant on May 19, 1943, Serial No. 487,550, now Patent No. 2,370,855, dated March 6, 1945, describes and claims an improvement in skip hoist controls involving variable (adjustable) voltage control. In the driving mechanism described and claimed in said application, variable (adjustable) voltage is employed for the lower portion of the speed range only, and shunt field control of the hoist motors is employed for the upper portion of the speed range. According to the disclosure of that application, a generator is employed feeding two hoist motors whose armatures are connected in series (or in parallel). The generator field windings are supplied from an exciter. Provision is made to vary the strength of the generator field in order to vary the voltage. Two brakes are provided whose operating coils are connected in series across the exciter. The two shunt fields of the two hoist motors are similarly connected in series and are supplied from the exciter, and resistors and relays are provided to vary their strength.

According to the Fox application Serial No. 487,550, referred to, the generator field is not reversed and the generator voltage is consequently unidirectional. The direction of rotation of the hoist motors is changed by armature-reversing contactors (which are opened and closed only under zero voltage and zero current conditions). This arrangement is employed because the motors are equipped with stabilizing windings. The current must always flow through these windings in the same direction. These windings are essential to the stable operation of the motors with weakened fields. The gear ratio between the motors and the hoist drum is substantially greater than in prior conventional practice. In view of this fact, and also because field-forcing is used at low speeds, motors of a given frame develop more torque at the hoist drum per armature ampere. The more effective use of the motors is reflected in more advantageous employment of the generator capacity.

The present invention relates to variable voltage control and provides a novel arrangement involving a three-unit motor generator set which may be located in the hoist house of each blast furnace. The motor generator sets at a plurality of blast furnaces at a single plant may be connected together for cooperation in a manner which will be described presently. According to an installation which has been placed in service, a three-unit motor generator set comprises a 600 horse power synchronous motor driving two approximately duplicate generators. One of these generators is rated at 250 kilowatts, 300 volts. This generator supplies adjustable voltage for the two motors driving the skip hoist. The other generator is rated at 200 kilowatts, 240 volts. This generator supplies the constant potential direct current service to the scale cars, cranes, and other auxiliary drives about the furnace.

An object of the present invention is to provide a novel skip hoist control involving a motor generator set comprising one driving motor and two approximately duplicate direct current generators for a supply of adjustable voltage for hoist operations and a supply of constant potential for general service, including provisions whereby either generator can be used to supply adjustable voltage for hoist service.

A further object is to provide a skip hoist control of the kind immediately above referred to in which either generator or both generators can supply constant potential for general service.

A further object is to provide a novel control for a skip hoist in which one direct current generator may be employed as a motor operating from a constant potential source (either from an adjacent skip hoist installation or from an outside source) to drive the other direct current generator, acting as a generator, to provide adjustable voltage for the skip hoist drive.

A further object is to provide, in a combination such as immediately above referred to, a motor generator set in which the motor, in the event that repairs thereto are required, may be replaced temporarily by a dummy shaft, or equivalent, said motor being temporarily removed from the combination.

A further object is to provide a battery of improved skip hoist controls involving motor generator sets in which the units at a plurality of blast furnaces may operate to supplement each other.

A further object is to provide an improved skip hoist control employing hoist driving means and a motor generator set including two generators, together with control mechanism whereby one of said generators may be employed to supply adjustable voltage to the hoist driving means and the other generator may be employed to supply constant voltage requirements of the hoist driving means, a further provision being made that the second named generator may be employed alternatively to supply adjustable voltage to the hoist driving means and the constant potential requirements of the hoist may be supplied from a separate source.

A further object is to provide an improved skip hoist control well adapted to meet the needs of commercial service.

Further objects will appear as the description proceeds.

Referring to the drawings—

Figure 1 is a diagrammatic layout illustrating the principles of the present invention as applied to a plurality of skip hoists at a like number of blast furnaces.

Figure 2 is an electrical diagram showing the electrical connections of a preferred embodiment of the present invention, said Figure 2 being divided into three parts, as follows: Figure 2—part A; Figure 2—part B; Figure 2—part C.

Figure 2, part A-1; Figure 2, part B-1; Figure 2, part C-1, are explanatory diagrams for simplifying the matter of locating, identifying and correlating the various elements, such as coils and contacts, of the various instrumentalities appearing in the corresponding parts of Figure 2.

Figure 3 is a development of a drum controller or its equivalent, a cam limit switch, forming part of the embodiment of the invention illustrated in the preceding figures.

Figure 5 is a top plan view of a hoist provided with two driving motors and two brakes.

Figure 6 is a more or less diagrammatic view illustrating part of a blast furnace, a skip incline associated therewith, a pair of skips, and an end elevation of the hoist for operating said skips.

Figure 7 is a side elevation of a hoist on approximately the same scale as the hoist shown in Figure 6.

Figure 1:
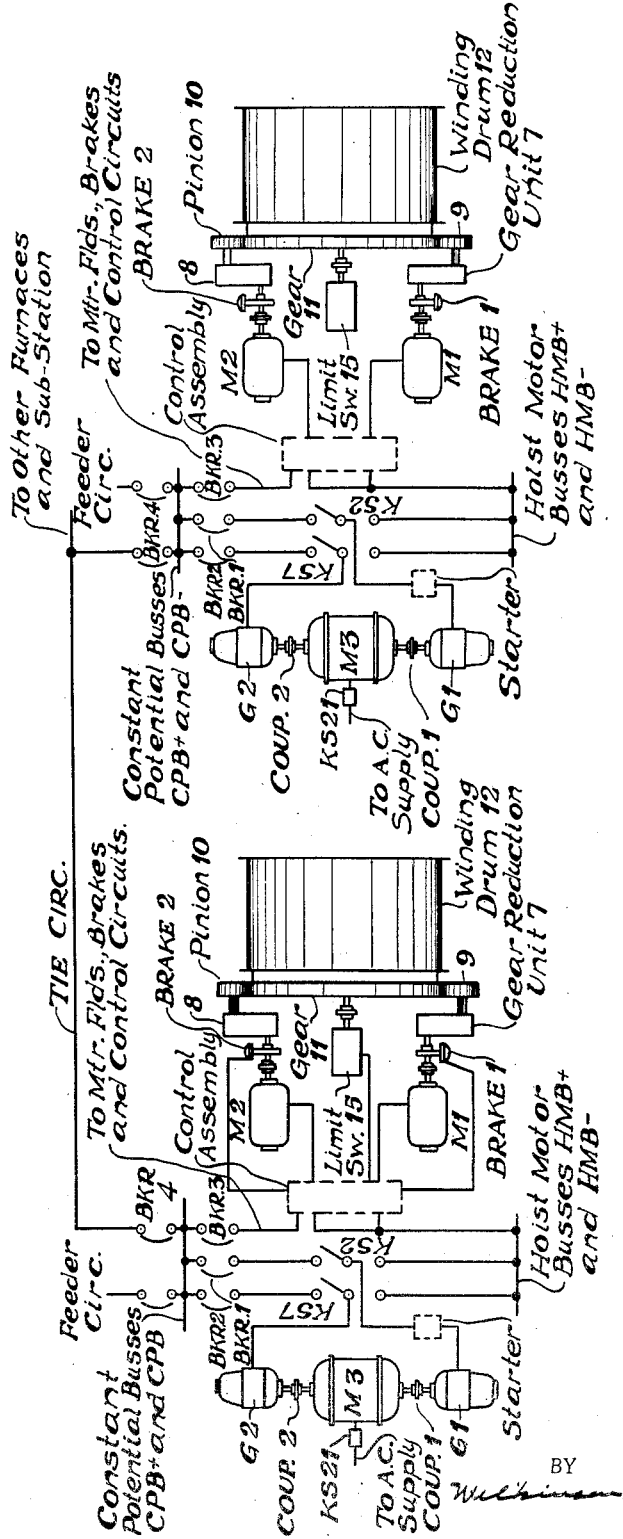

Referring first to Figures 5, 6 and 7, Figure 5 illustrates a pair of driving motors M1 and M2. Said motors are connected, respectively, to brakes indicated as Brake 1 and Brake 2 by means of couplings 3 and 4. Said brakes Brake 1 and Brake 2 are connected, respectively, to gear reduction units 7 and 8. The low speed sides of said gear reduction units 7 and 8 are connected, respectively, to pinions 9 and 10 which mesh with the gear 11. Said gear 11 is rigidly secured to the drum 12, which has secured thereto the cables 13 and 14. Said cables 13 and 14 may be connected, respectively, to the right skip and the left skip of a blast furnace charging mechanism. It will be understood that when one or both of the motors M1—M2 are energized to cause rotation of the winding drum 12 in one direction, one of the cables will be wound up upon the drum 12 and the other of said cables will be paid off, and, conversely, when the energization of one or both of the motors M1—M2 is such as to cause reverse rotation of the winding drum 12, the movements of said cables 13 and 14 will be reversed. Limit switch means connected to be driven in synchronism with the drum 12 are indicated diagrammatically by the numeral 15.

Referring to Figure 6, the numeral 16 indicates a blast furnace and the numeral 17 indicates a skip incline associated with said blast furnace. Said skip incline is provided with a pair of skips 18 and 19, one of which is illustrated as being in the skip pit 20 and the other of which is indicated in capsized position for delivering material into the hopper 21 at the top of the blast furnace 16. The skip 18 is shown in position to receive material from the scale car 22. The cables 13 and 14 associated with the winding drum 12 are connected to the two skips 19 and 18, being trained over sheaves which need not be described in detail.

Referring now to Figure 1, a diagrammatic layout is illustrated showing the connections at a plurality of blast furnaces. Two blast furnaces are illustrated, but the installations at any number of blast furnaces may be connected up in the manner illustrated in Figure 1. The layout at each blast furnace may be like that at each of the other blast furnaces, and a description of one will suffice for all. Figure 1 for purposes of simplicity shows two or three wire circuits as a single wire. Two generators G1 and G2 are illustrated, which with the motor M3 form a motor generator set. Said motor M3 is illustrated as being disposed between the generator G1 and G2, the shafts of said generators and said motor being in alignment. The shaft of the motor M3 is connected to the shaft of the generator G1 by a coupling Coup. 1, and said shaft of the motor M3 is connected to the shaft of the generator G2 by means of a coupling Coup. 2. As will be explained presently, when it is necessary to remove the motor M3 from the assembly for repairs or for other reasons, said motor may be replaced by a dummy shaft temporarily coupled to the couplings Coup. 1 and Coup. 2. Said motor M3 is adapted to be connected to a source of A. C. supply through the three-pole switch KS21.

Hoist motor busses (indicated by a single line) bear the characters HMB+ and HMB—. Constant potential busses indicated by a single line bear the characters CPB+ and CPB—. Switches KS2, KS7 and circuit breakers indicated as BKR1, BKR2 and BKR3 are provided having functions of controlling the circuits between said hoist motor busses and said constant potential busses, and a control assembly which comprises an assembly of contactors, relays, and other secondary elements of the control for the hoist, all of which are shown more in detail in other figures and will be described presently. Said Figure 1 also illustrates in connection with each of the blast furnace installations a starter which is an assembly of contactors, relays, resistors and associated parts necessary to starting the unit G1 as a motor. The details as used in each of the blast furnace installations is shown more in detail in the upper portion of Figure 2—part A, above the switch KS2.

The installations at the various blast furnaces are connected together by means of a tie circuit indicated as Tie circ., which tie circuit may also be connected to an independent source of direct current supply such as a substation. The tie circuit is connected to the several constant potential busses CPB+, CPB—, by means of circuit breakers indicated by the character BKR4.

Figure 1 also indicates feeder circuits adapted to be supplied from the constant potential busses CPB+, CPB—, for the supply of current to operate scale cars, cranes, and other auxiliary drives about the furnace. Certain instrumentalities associated with the motive means of the hoist also require constant potential. These instrumentalities are the following, to be referred to with more particularity hereinafter.

Synchronous motor field (Syn. mtr. fld.) of the driving motor M3.

Field windings (Gen. fld. 1 and Gen. fld. 2) of the generators G–1 and G–2, respectively.

The shunt field windings (Mtr. sh. fld. 1 and Mtr. sh. fld. 2) of the motors M1 and M2, respectively.

The coils (Brake 1 and Brake 2) of Brakes 1 and 2, respectively.

The control circuits of the various contactors and relays.

A detailed explanation of the electrical instrumentalities involved in the illustrated embodiment of the present invention may be prefaced by a statement of the significance of the numerals and letters used thereon, as follows:

The letters AT refer to the operating coils and contacts responsive thereto of various timing relays of a magnetic motor starter.

The letter A refers to the operating coils and contacts responsive thereto of accelerating relays of a magnetic motor starter.

The letters GM refer to the operating coil and contacts responsive thereto of the main starting contactor of a magnetic motor starter.

The letters R, as for example R1—R2, R8—R9, refer to resistors in the magnetic motor starter circuit and the generator field circuits.

The letters MR refer to the resistors in the motor shunt field circuit.

The letters GF refer to the operating coils and contacts responsive thereto to the generator field relays.

The numerals 11 and 13 following the letters LU. and the numerals 12 and 14 following the letters RU. as for example RU12 and LU13. refer to instrumentalities particularly associated with motor No. 1.

The numerals 21 and 23 following the letters LU. and the numerals 22 and 24 following the letters RU, as for example RU22 and LU23, refer to instrumentalities particularly associated with motor No. 2.

The letters LU refer to the operating coils and contacts responsive thereto of contactors which function only to cause the left skip to travel up the incline.

The letters RU refer to the operating coils and contacts responsive thereto of contactors which function only to cause the right skip to travel up the incline.

The letters FW refer to the operating coils and contacts responsive thereto of motor field weakening relays which function to accelerate the hoist motors and to decelerate them.

The letters BR refer to the operating coil and contacts responsive thereto of the brake relay.

The letters UV refer to the operating coil and contacts responsive thereto of an under-voltage or low-voltage relay.

The letters LSU refer to the operating coil and the contacts responsive thereto of a relay controlling the movement of the left skip up.

The letters RSU refer to the operating coil and the contacts responsive thereto of a relay controlling the movement of the right skip up.

The letters LS refer to the contacts of the limit switch elements controlling upward movement of the left skip.

The letters RS refer to the contacts of the limit switch elements controlling upward movement of the right skip.

The letters LSUB refer to a push-button control for starting the left skip up.

The letters RSUB refer to a push-button control for starting the right skip up.

The letters FT refer to the operating coil and contacts responsive thereto of a timing relay associated with one of the field weakening relays.

The letters CBR refer to the operating coil and contacts responsive thereto of the series brake relay.

The letter T refers to the operating coils and contacts responsive thereto of various timing relays.

The letters SDR refer to the operating coils and contacts responsive thereto of slow-down relays, 1SDR referring to first slow-down and 2SDR referring to second slow-down.

In general, contactors and relays are identified by the characters applied to their operating coils. and the contacts are differentiated by the addition of suffixes. For example, the character 3A represents the operating coil of a corresponding contactor, and character 3Aa represents the contacts of this contactor.

Figure 4:
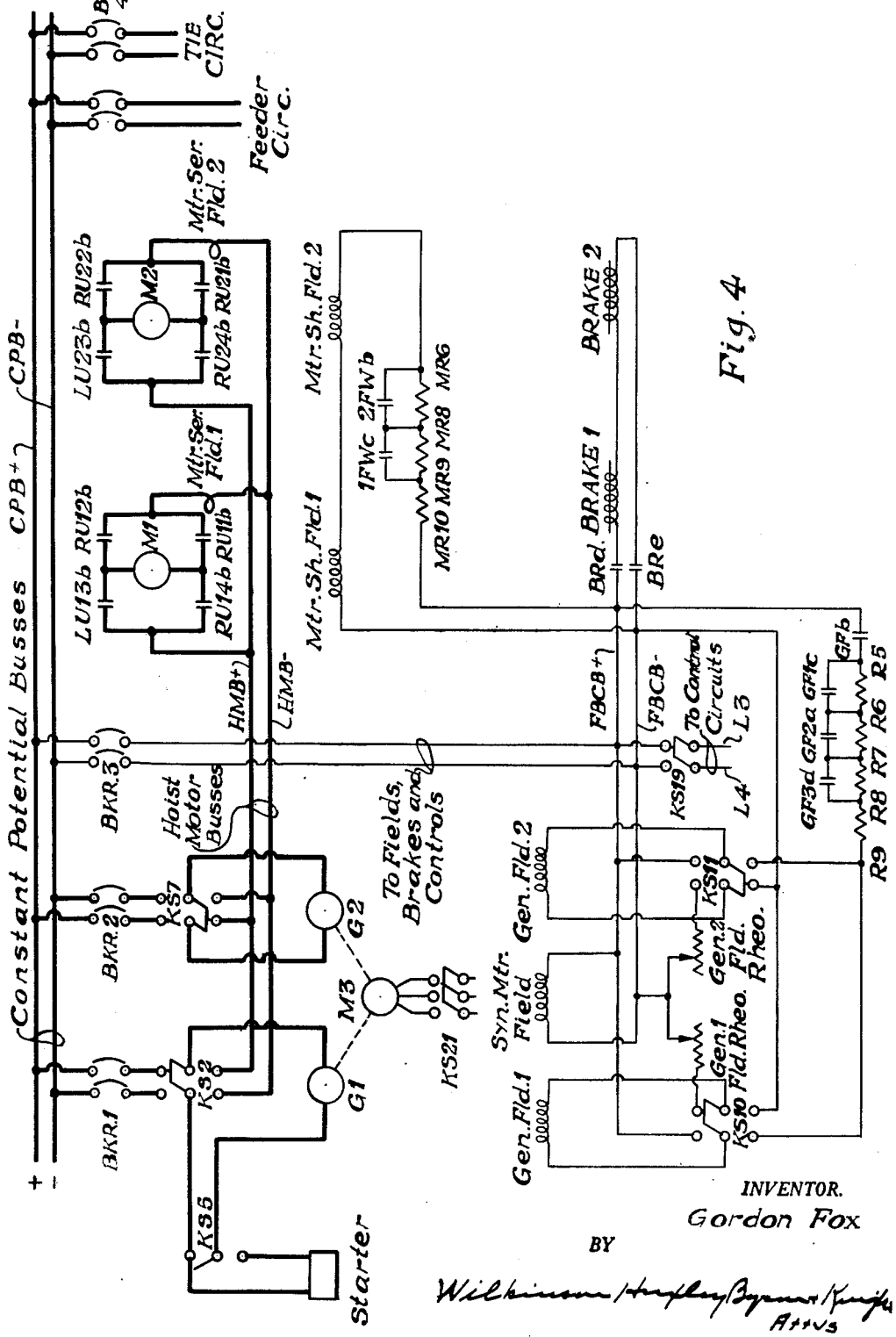
Figure 4 is a simplified diagram of Figure 2, certain instrumentalities being omitted from Figure 4 for purposes of simplicity.

Referring now to Figure 2, which is in three parts, to wit—part A, part B and part C, the various circuits are shown in greater detail. The three-pole switch KS21 (Fig. 2, part A) is shown as controlling the three terminals of a source of three-phase A. C. supply to connect said source to the synchronous motor M3. Double-pole knife switches KS2 and KS7 and circuit breakers BKR1 and BKR2 are provided for connecting either or both generators G1 and G2 to the D. C. constant potential busses indicated by the letters CPB+, CPB—, or for connecting either generator to the hoist motor busses indicated by the letters HMB+, HMB—. A D. C. bus circuit breaker BKR3 is provided which may be used for connecting the fields of the motor M3 and the field and brake control busses indicated by the letters FBCB+ and FBCB—, to the constant potential busses CPB+, CPB—. A double-pole knife switch KS1 (Fig. 2, part A) is provided for connecting motor starter control circuits to the constant potential busses CPB+ and CPB— when generator G1 is to be operated as a motor. The starter, indicated schematically in Figures 1 and 4, is, as stated above, an assembly of contactors, relays, resistors and associated parts necessary to the starting of the unit G1 as a motor. The details of the starter are illustrated in Figure 2, part A, above the double-pole, double-throw switch KS2. The single-pole, double-throw knife switch KS5 connects this starter into the armature circuit of the unit G1.

In normal commercial operation according to the installation above mentioned the generator G2 will develop voltages varying from zero to approximately 325 volts D. C. maximum. Generator G1 provides a constant potential D. C. supply of approximately 250 volts required for the brakes, the generator fields, the motor fields, and the coils of the magnetic contactors and relays.

The characters L1 and L2 (Fig. 2, part A), represent the two sides of an electrical circuit across which are connected the magnetic contactors and relays for the starter when the unit G1 is to be operated as a motor. Connected across the mains L1 and L2 is a circuit including the coil of accelerating contactor coil 3A, timing relay contacts 3ATa biased to closed position and accelerating contactor contacts 2Aa biased to open position. Said contacts 3ATa are responsive to the timing relay coil 3AT, being held open when said coil 3AT is energized. The contacts 2Aa are responsive to the accelerating contactor coil 2A, being held closed when said coil 2A is energized. Also connected across the mains L1, L2, is a circuit including the accelerating contactor coil 2A, timing relay contacts 2ATa biased to closed position and accelerating contactor contacts 1Aa biased to open position. Said contacts 2ATa are responsive to the timing relay coil 2AT, being held open when said coil 2AT is energized. The contacts 1Aa are responsive to the accelerating contactor coil 1A, being held closed when said coil 1A is energized. Also connected across the mains L1 and L2 is a circuit including the accelerating contactor coil 1A, timing relay contacts 1ATb, biased to closed position, and main contactor contacts 1GMc, biased to open position. Said contacts 1ATb are responsive to the timing relay coil 1AT, being held open when said coil 1AT is energized. The contacts 1GMc are responsive to the coil 1GM of the main starting contactor, being held closed when said coil 1GM is energized. Also connected across the mains L1, L2, is a circuit including the timing relay coil 1AT and the main coil contacts 1GMb, biased to closed position. Said contacts 1GMb are responsive to the coil 1GM of the main starting contactor, being held open when said coil 1GM is energized. Also connected across the mains L1, L2, are the start button P and the stop button Q. When the start button P is depressed, its contacts are closed, and when the stop button Q is depressed, its contacts are opened. In the circuit of buttons P and Q are the coil of main starting contactor 1GM and timing relay contacts 1ATa, biased to open position. In parallel relationship with the contacts 1ATa are the main coil contacts 1GMa, biased to open position. The contacts 1ATa are responsive to timing relay coil 1AT, being held closed when said coil 1AT is energized. The contacts 1GMa are responsive to coil 1GM, being held closed when said coil 1GM is energized. Also connected across the mains L1, L2, is a circuit including the armature of the generator G1 in series with a set of resistors having a number of taps designated as R1, R2, R3 and R4. Connected to the taps of these resistors are a plurality of relay coils and relay contacts. Across the taps R1—R2 are the relay contacts 1Ab; across the taps R2—R3 are the relay contacts 2Ab; across the taps R3—R4 are the relay contacts 3Aa. Also across the taps R1—R2 is the timing relay coil 2AT, and across the taps R1—R3 is the timing relay coil 3AT. The relay contacts 1Ab, 2Ab and 3Aa are all biased to open position and are adapted to be closed when their corresponding operating coils 1A, 2A and 3A are energized. Also in series with the armature of the generator G1 are the contacts 1GMd responsive to the main starting contactor coil 1GM. Said contacts 1GMd are biased to open position and are held closed when the corresponding operating coil 1GM is energized.

Connected across the busses FBCB+ and FBCB— are the shunt fields of generators G1 and G2 designated Gen. fld. 1 and Gen. fld. 2 (Fig. 2, part B). Double-pole knife switch KS10 is provided to connect Gen. fld. 1 across the busses FBCB+ and FBCB— with the rheostat designated Gen. 1 fld. rheo. in circuit, or, alternatively, with resistors R5—R9 in circuit. Similarly, double-pole knife switch KS11 is provided to connect Gen. fld. 2 across the busses FBCB+ and FBCB— with the rheostat designated as Gen. 2 fld. rheo. in circuit, or, alternatively, with resistors R5—R9 in circuit. Connected to the taps of these resistors are a number of relay contacts. Across the taps R5—R6 are the relay contacts GF1c; across the taps R6—R7 are the relay contacts GF2a; and across the taps R7—R8 are the relay contacts GF3d. The relay contacts GF1c, GF2a and GF3d are all biased to open position and are adapted to be closed when their corresponding operating coils GF1, GF2 and GF3 are energized. Also in series with Gen. fld. 2 and the set of resistors are the generator field relay contacts GFb biased to open position and adapted to be held closed when their corresponding operating coil GF is energized.

Connected across the busses HMB+ and HMB— are the armatures of the motors M1 and M2 in series with their respective series field, Mtr. 1 ser. fld. and Mtr. 2 ser. fld. Directional contactors RU12b and RU14b and RU22b and RU24b are provided for directing current in one direction through the armatures of the hoist motors M1 and M2 respectively, and directional contactors LU11b and LU13b, and LU21b and LU23b, are provided for alternatively directing current through said armatures in the opposite direction (Fig. 2, part A).

Connected across the busses FBCB+ and FBCB— (Fig. 2, part B) is a circuit including the resistor having the taps MR6, MR8 and MR9 and the shunt field windings of motors M1 and M2. Connected across the taps MR6 and MR8 are the motor field relay contacts 2FWb and connected across the taps MR8 and MR9 are the motor field relay contacts 1FWc. Both of these relay contacts are biased to open position and are adapted to be held closed when their corresponding operating coils 2FW and 1FW are energized. Also connected across the busses FBCB+ and FBCB— is a circuit including the brake relay contacts BRd and BRe, both biased to open position but held closed when their operating coil BR is energized; the operating coil of brake 1 designated as Brake 1; and the operating coil of brake 2, designated as Brake 2.

A double-pole knife switch KS19 (Fig. 2, part B) is provided for supplying the operating coils of the contactors and relays from the busses FBCB+ and FBCB−. Said double-pole knife switch KS19 connects the busses FBCB+ and FBCB− to the wires L3 and L4 respectively.

Connected across the wires L3 and L4 below the knife switch KS19 is a circuit including the contact X adapted to be operated by a walking beam type push-button, which also contains contacts Y and Z. When the end of the push-button marked "Stop-reset" is depressed, the contact X is in circuit-closing position and contacts Y and Z are in open position. When the end of the switch marked "Run" is depressed, the contacts Y and Z are closed and the contact X is in open circuit position. The letters UV+ indicate a wire whose energization is dependent upon the closure of contacts UVa. When contacts UVa are closed, the wire UV+ is an extension of and has the same polarity as wire L3 and the bus FBCB+. The under-voltage relay contacts UVa are controlled by the operating coil UV. When the coil UV is energized, said contacts UVa are held in closed position, and when said coil UV is deenergized said contacts UVa will be in open position. The circuit which includes the reset contact X also includes the operating coil UV. The contacts UVb, biased to open position, are in shunting relationship with the push-button contact X. Said contacts UVb are held closed when their operating coil UV is energized. Also connected across the wires L3 and L4 below knife switch KS19 is a circuit including contacts UVc biased to open position; stop button contact Y in closed position; and two branches, as follows: The first branch includes the contact D adapted to be operated by the walking beam type switch LSUB—RSUB, at one end of which is the button LSUB and at the other end of which is the button RSUB. When said button LSUB is depressed, said contact D is in closing position, and when said button RSUB is depressed said contact D is in open position. The circuit of the contact D also includes limit switch contacts LS7 and LS8; directional relay operating coil LSU; and Stop button contact Z in closed position. The second branch includes the contact E, adapted to be operated by the walking beam type switch LSUB—RSUB. When the button LSUB is depressed, said contact E is in open position, and when button RSUB is depressed said contact E is in closing position. The circuit of contact E also includes limit switch contacts RS7 and RS8; directional relay operating coil RSU; and stop button Z in closed position. The contacts UVc are adapted to be held closed when their operating coil UV is energized.

Connected across the wires UV+ and L4 are two branch circuits which include directional contactor operating coils. The first branch includes the directional relay contacts LSUd and LSUb and directional contactor operating coils LU11, LU13, LU21 and LU23. Said contacts LSUd and LSUb are biased to open position but are held closed when the directional relay operating coil LSU is energized. The second branch includes the directional relay contacts RSUd and RSUb and directional contactor operating coils RU12, RU14, RU22 and RU24. Said contacts RSUd and RSUb are biased to open position but are held closed when the directional relay operating coil RSU is energized. Also connected across the wires UV+ and L4 is a circuit composed of several branches. Common to all these branches are the directional relay contacts RSUc and LSUc (Fig. 2, part C), which are in parallel relationship to each other. The contacts RSUc and LSUc are biased to open position, but are held closed when the directional relay operating coils RSU and LSU, respectively, are energized. The first branch includes the contacts 2FTa and 1SDRa, in parallel relationship to each other. Timing relay contacts 2FTa are biased to open position but are held closed when timing relay coil 2FT is energized. First slow-down relay contacts 1SDRa are held open when first slow-down relay coil 1SDR is energized. Also included in the first branch is the motor field weakening relay coil 2FW and the directional relay contacts RSUe and LSUe, in parallel relationship, both biased to open position. Said contacts RSUe and LSUe are held closed when the directional relay operating coils RSU and LSU, respectively, are energized. The second branch includes motor field weakening relay contacts 1FWa, the timing relay operating coil 2FT and, in parallel circuits, directional relay contacts LU11a, LU13a, LU21a and LU23a in one of said parallel circuits, and RU12a, RU14a, RU22a and RU24a in the other of said parallel circuits. Said contacts 1FWa are biased to open position and are held closed when motor field weakening relay coil 1FW is energized. Said contacts LU11a, LU13a, LU21a and LU23a are biased to open position, and are held closed when directional contactor operating coils LU11, LU13, LU21 and LU23, respectively, are energized. Said contacts RU12a, RU14a, RU22a and RU24a are biased to open position and are held closed when directional contactor operating coils RU12, RU14, RU22 and RU24, respectively, are energized. The third branch includes brake relay operating coil BR, brake relay contacts BRa, biased to open position, generator field relay contacts GFa, biased to open position, generator field relay contacts GF1a, biased to open position, series brake relay contacts CBRa, biased to open position and in parallel with contacts BRa, GFa and GF1a, and directional contactor contacts LU11a, LU13a, LU21a and LU23a and RU12a, RU14a, RU22a and RU24a. Said contacts BRa, GFa, GF1a, CBRa, LU11a, LU13a, LU21a and LU23a and RU12a, RU14a, RU22a and RU24a are held closed when their respective operating coils BR, GF, GF1, CBR, LU11, LU13, LU21 and LU23 or RU12, RU14, RU22 and RU24 are energized. Also included in the third branch is generator field relay coil GF, which is in parallel relationship with brake operating coil BR and contacts BRa, GFa and GF1a. Coil GF is also in shunting relationship with contacts 1FWa and coil 2FT in the second branch. The fourth branch includes motor field relay contacts 1FWb, biased to closed position; timing relay coil 5T; and generator field relay contacts GF1d biased to open position (Fig. 2, part C). Said contacts 1FWb are held open when the operating coil 1FW is energized. Said contacts GF1d are held closed when the operating coil GF1 is energized.

Also connected across the wires UV+ and L4 is a circuit consisting of two branches. Both branches include the directional relay contacts RSUf and LSUf, which are in parallel relationship with each other and which are both biased to open position. The first branch includes first slow-down relay contacts 1SDRc, biased to closed position, and timing relay contacts 4Ta, biased to open position; field weakening relay coil IFW; and directional relay contacts RSUe and LSUe, which are in parallel relationship to each other and which are both biased to open position. Said contacts ISDRc and 4Ta are in parallel relationship with each other. Said contacts ISDRc are held open when operating coil ISDR is energized, and said contacts 4Ta are held closed when operating coil 4T is energized. Said contacts RSUf, RSUe, LSUf and LSUe are held closed when their respective operating coils RSU and LSU are energized. The second branch includes timing relay coil 4T and generator field relay contacts GF3b, biased to closed position. Said contacts GF3b are held open when operating coil GF3 is energized.

Also connected across the wires UV+ and L4 is a circuit which includes generator field operating coil GF1 and timing relay contacts ITa, biased to closed position. Said contacts ITa are held open when operating coil IT is energized.

Also connected across the wires UV+ and L4 are two circuits, one of which includes the timing relay coil IT and brake operating relay contacts BRb biased to closed position. Said contacts BRb are held open when operating coil BR is energized. The other circuit includes timing relay coil 2T and generator field relay contacts GF1b, biased to closed position. Said contacts GF1b are held open when operating coil GF1 is energized.

Also connected across the wires UV+ and L4 is a circuit consisting of three branches. The first branch includes generator field relay coil GF2 and timing relay contacts 2Ta, biased to closed position. Said contacts 2Ta are held open when operating coil 2T is energized. Alternatively, second slow-down relay contacts 2SDRa, biased to open position, may be included in the first branch. Said contacts 2SDRa are held closed when operating coil 2SDR is energized. The second branch includes timing relay coil 3T and generator field relay contacts GF2b, biased to closed position. Said contacts GF2b are held open when operating coil GF2 is energized. Timing relay contacts 6Ta, biased to open position, connect branches one and two together. Said contacts 6Ta are held closed when operating coil 6T is energized. The third branch includes timing relay coil 6T and generator field relay contacts GF3a, biased to open position. Said contacts GF3a are held closed when operating coil GF3 is energized.

Also connected across the wire UV+ and L4 is a circuit which includes timing relay contacts 5Ta, biased to open position, timing relay contacts 3Ta, biased to closed position, generator field relay coil GF3, and directional relay contacts RSUg and LSUg, both biased to open position and in parallel relationship with each other. Said contacts 5Ta are held closed when operating coil 5T is energized, and said contacts 3Ta are held open when operating coil 3T is energized. Alternatively, this circuit may include first slow-down relay contacts ISDRb, biased to open position. Said contacts ISDR are held closed when operating coil ISDR is energized.

Also connected across the wires UV+ and L4 is a circuit which includes the first slow-down relay coil ISDR, directional relay contacts RSUh and LSUh, both biased to open position, limit switch contacts RS2 and LS2, and contact H of a walking beam type push-button. Said contacts RSUh and LSUh are closed when directional relay coils RSU and LSU, respectively, are energized. The limit switch contacts RS2 and LS2 are adapted to be controlled by a mechanism to be described presently. Contact H is adapted to be in closed position when the end of the walking beam type push-button marked "Normal" is depressed, and in open position when the end of the walking beam type push-button marked "Slow" is depressed.

Also connected between the wires UV+ and L4 is a circuit which includes second slow-down relay coil 2SDR, directional relay contacts RSUj and LSUj, both biased to open position, and limit switch contacts RS6 and LS6. Said contacts RSUj and LSUj are closed when directional relay coils RSU and LSU, respectively, are energized. The limit switch contacts RS6 and LS6 are adapted to be controlled by mechanism to be described presently.

The limit switch contacts RS2, LS2, RS6, LS6, RS7, LS7, RS8 and LS8 are adapted to be bridged and unbridged by bridging members or segments bearing the corresponding reference characters followed by a zero. (Fig. 3.) For example, contacts RS2 are bridged by RS20. The bridging members may be fixed to a drum, and will move in unison in performing their functions with their corresponding contacts, this movement being responsive to the movement of the skips. The development of the drum segments is illustrated in Figure 3. A cam switch, which is the equivalent, may be substituted for the drum type limit switch 15.

Normal two-motor operation

For normal operation the motors M1 and M2 for driving the hoist are supplied from generator G2 (Fig. 2, part A). Generator G1 is normally used to supply the D. C. constant potential busses CPB+ and CPB— for auxiliary power around the blast furnace area. Both generators are driven by a synchronous motor designated as M3.

To operate in this manner, double-pole knife switch KS7 is thrown downwardly to connect the armature of generator G2 to the adjustable voltage busses HMB+ and HMB— for the hoist motors. Double-pole knife switch KS1 is left open. Double-pole knife switch KS2 is closed upwardly and double-pole circuit breaker BKR1 is closed to connect the armature of generator G1 to the constant potential busses CPB+ and CPB—. The double-pole circuit breaker BKR3 is closed and the double-pole circuit breaker BKR2 is left open. Closure of circuit breaker BKR3 connects the field windings of motor M3 and the field, brake, and control busses FBCB+ and FBCB— to the constant potential busses CPB+ and CPB—. Single-pole knife switch KS5 is closed upwardly. Double-pole knife switch KS10 is thrown upwardly for self-excitation of generator G1 through its generator field rheostat, Gen. I fld. rheo. Double-pole knife switch KS11 is thrown downwardly to connect the field of generator G2 to the field and brake control busses FBCB+ and FBCB— through resistors R5—R9. Double-pole knife switch KS19 is closed to connect the field, brake, and control busses FBCB+ and FBCB— to the wires L3 and L4.

Assume that the right skip is to be hoisted. The under-voltage relay coil UV (Fig. 2, part B) is connected across the wires L3, L4. Energization of the coil UV is accomplished by depressing the "Stop-Reset" button (Fig. 2, part B), thereby moving the contact X into closing position. Energization of the coil UV results in the closure of the contacts UVb, which provide a holding circuit for coil UV. Thus contacts UVb remain closed after the "Run" button is depressed, moving contact X to open position.

When the hoist is at rest, although the motor generator set M3, G1 and G2 is in operation, the generated voltage of generator G2 is zero because generator field relay contacts GFb are open. The motor brakes Brake 1 and Brake 2 (Fig. 2, part B) are set, and motor shunt fields Mtr. 1 sh. fld. and Mtr. 2 sh. fld. (Fig. 2, part B) are weakened by resistance MR6—MR10.

To start the movement of the right skip from its lowermost position, the push-button RSUB (Fig. 2, part B) is depressed, moving the contact E to its closed position. This results in the energization of the coil RSU (Fig. 2, part B), since the limit switch contacts RS7 and RS8 are bridged by segments RS70 and RS80 at this time (Fig. 3). The circuit is through UVc; contacts Y; RSUB; contact E; RS8; RSU; RS7; and contact Z to wire L4. Energization of the coil RSU results in the closure of the contacts RSUb and RSUd (Fig. 2, part B), causing the energization of the coils of directional contactors RU12, RU14, RU22 and RU24 (Fig. 2, part B), which results in the closing of contacts RU12b, RU14b, RU22b and RU24b (Fig. 2, part A). This completes the main circuit of the armature of generator G2 (Fig. 2, part A) and the armatures of the hoist motors M1 and M2 (Fig. 2, part A) through the hoist motor busses HMB+ and HMB—. No current flows in this circuit at this time, however, inasmuch as the generator field circuit marked Gen. fld. 2 (Fig. 2, part B) is open at the contacts GFb.

Closure of the contacts RSUf (Fig. 2, part C) results in the energization of timing relay 4T (Fig. 2, part C). This causes contacts 4Ta to close, resulting in the energization of field relay coil 1FW (Fig. 2, part C) through contacts RSUe (Fig. 2, part C), which had closed previously.

Energization of coil 1FW results in closure of contacts 1FWc (Fig. 2, part B) which short-circuit the section MR8—MR9 of the resistor in circuit with motor shunt fields Mtr. 1 sh. fld. and Mtr. 2 sh. fld. of motors M1 and M2. Energization of coil 1FW also results in the closure of contacts 1FWa (Fig. 2, part C), which causes timing relay 2FT to be energized through contacts RSUc, which had closed previously, and through contacts RU12a, RU14a, RU22a and RU24a, also previously closed. This causes closure of contacts 2FTa, which results in energization of field relay coil 2FW (Fig. 2, part C). Energization of coil 2FW results in closure of contacts 2FWb (Fig. 2, part B) which short-circuit the section MR6—MR8 of the resistor in circuit with Mtr. 1 sh. fld. and Mtr. 2 sh. fld. Thus, these motor fields are strengthened and "forced" to approximate saturation.

The energization of operating coils RU12, RU14, RU22 and RU24 also results in the closure of contacts RU12a, RU14a, RU22a and RU24a (Fig. 2, part C), which causes the energization of the generator field relay coil GF (Fig. 2, part C). Energization of this coil results in the closure of contacts GFb (Fig. 2, part B), which completes the circuit of the field winding Gen. fld. 2, this circuit including the resistor R5—R9. Voltage is therefore developed in the armature of generator G2 (Fig. 2, part A), and current flows in the main circuit through the hoist motor busses HMB+ and HMB— and through the armatures of the hoist motors M1 and M2 (Fig. 2, part A).

Current in this circuit flowing through the brake relay series coil CBR (Fig. 2, part A) results in the closure of the contacts CBRa (Fig. 2, part C), thereby energizing the brake relay coil BR. Energization of coil BR results in the closure of the contacts BRd and BRe (Fig. 2, part B), causing the energization of the coils of Brake 1 and Brake 2 and resulting in the release of these brakes. The brake coil BR sets up a maintaining circuit for itself through its contacts BRa when relay contacts GF1a close, as later described.

When the brakes release, movement of the hoist starts. The coil of time delay relay 1T (Fig. 2, part C) is energized while the hoist is at rest. When brake relay BR closes, the coil of relay 1T is deenergized at contacts BRb. After a predetermined time delay inherent in the relay, contacts 1Ta close, causing the coil of generator field relay GF1 (Fig. 2, part C) to be energized. The result is that contacts GF1c (Fig. 2, part B) close and short-circuit resistance R5—R6 in the circuit of Gen. fld. 2, which causes the voltage generated in armature of generator G2 to increase and thereby accelerate the hoist.

Energization of the relay coil GF1 causes its contacts GF1b (Fig. 2, part C) to open, thus deenergizing the timing relay coil 2T (Fig. 2, part C). After a predetermined time interval inherent in the relay, contacts 2Ta close, and generator field relay coil GF2 is energized, since contacts 2SDRa are closed at this time. This results in closure of contacts GF2a (Fig. 2, part B) and consequent short-circuiting of resistance R6—R7 in the circuit of Gen. fld. 2, which causes the voltage generated in the armature of generator G2 to increase and further accelerate the hoist.

Energization of the relay coil GF2 causes its contacts GF2b to open, thereby deenergizing the time delay relay coil 3T (Fig. 2, part C). After a predetermined time interval inherent in the relay, contacts 3Ta close, and generator field relay coil GF3 (Fig. 2, part C) is energized, since contacts 1SDRb and RSUg are closed at this time. This results in closure of contacts GF3d (Fig. 2, part B), which short-circuits resistance R7—R8 in the circuit of Gen. fld. 2, and causes a further increase in the voltage generated by the armature of generator G2 to its maximum value.

Energization of generator field relay coil GF3 causes its contacts GF3b to open, thereby deenergizing the time delay relay 4T (Fig. 2, part C). This results in the opening of contacts 4Ta, after a predetermined time interval inherent in the relay, which consequently causes relay coil 1FW to be deenergized, since at this time the contacts 1SDRc are open. Deenergization of the motor field relay coil 1FW results in the opening of contacts 1FWc (Fig. 2, part B), introducing resistor MR8—MR9 into the field circuit of motor shunt fields Mtr. 1 sh. fld. and Mtr. 2 sh. fld. Opening of the contacts 1FWa causes time-delay relay coil 2FT (Fig. 2, part C) to be deenergized, thus opening its contacts 2FTa, after a predetermined time interval inherent in the relay, and resulting in the deenergization of motor field weakening relay coil 2FW, since contacts 1SDRa are open at this time. Deenergization of coil 2FW causes contacts 2FWb (Fig. 2, part B) to open, introducing the resistor MR6—MR8 into the circuit of motor shunt fields Mtr. I sh. fld. and Mtr. 2 sh. fld. The introduction of resistors MR6—MR8—MR9 into the field circuits of the motors weakens the motor fields and causes the hoist speed to increase to its maximum value.

The hoist continues to run at its top speed until the slow-down point is reached as the right skip (the hoisting of which is being discussed) approaches the upper end of its travel. At this point the limit switch contacts RS2 (Fig. 2, part C), which were closed at the beginning of the cycle, are opened by segment RS20 (Fig. 3). This causes the deenergization of the first slow-down relay coil ISDR (Fig. 2, part C) (which had closed when directional relay RSU closed at the beginning of the skip trip), resulting in the closure of contacts ISDRc and subsequent energization of the motor field relay coil IFW (Fig. 2, part C). The energization of coil IFW causes contacts IFWc to close and short-circuit the resistor MR8—MR9. Deenergization of coil ISDR also causes contacts ISDRa (Fig. 2, part C) to close, resulting in the energization of motor field relay coil 2FW. The energization of coil 2FW causes contacts 2FWb (Fig. 2, part B) to close and short-circuit the resistor MR6—MR8. Thus, the motor fields are strengthened and forced.

The deenergization of the first slow-down relay coil ISDR also results in the opening of its contacts ISDRb (Fig. 2, part C), which are in the circuit of generator field relay coil GF3. There is no immediate result, since a parallel circuit through contacts 6Ta is closed. However, as a result of the closure of motor field relay IFW, contacts IFWb open (Fig. 2, part C) and the deenergization of time delay relay 6T follows. In consequence, contacts 6Ta open, after a predetermined time interval inherent in the relay, causing coil GF3 to be deenergized. This results in opening of contacts GF3d (Fig. 2, part B), which introduces resistor R7—R8 in the circuit of Gen. fld. 2 and causes the voltage generated by the armature of generator G2 to decrease. Consequently the speed of the hoist is decreased.

At the second slow-down point, limit switch contacts RS6 (Fig. 2, part C) are opened by segment RS60 (Fig. 3). The second slow-down relay coil 2SDR is thereby deenergized, and contacts 2SDRa (Fig. 2, part C) are opened, resulting in the deenergization of generator field relay coil GF2, since contacts 6Ta normally will have opened by this time. (Contacts 6Ta open after a time delay after deenergization of coil 6T in response to the opening of contacts GF3a.) This causes contacts GF2a (Fig. 2, part B) to open, thus introducing the resistor R6—R7 in the circuit of Gen. fld. 2 and causing the voltage generated by the armature of generator G2 to decrease. The result is a further decrease in the speed of the hoist.

The hoist continues to run at this decreased speed until the end of the skip trip. Limit switch contacts RS7 and RS8 (Fig. 2, part B) are then opened by segments RS70 and RS80 (Fig. 3), deenergizing the directional relay coil RSU, resulting in the opening of contacts RSUb and RSUd (Fig. 2, part B) and the deenergizing of the directional contactor coils RU12, RU14, RU22 and RU24. This results in the opening of the contacts RU12b, RU14b, RU22b and RU24b (Fig. 2, part A), thereby opening the main circuit of the motor armatures of the hoist motors M1 and M2.

Deenergization of directional relay RSU causes generator field relay coil GF (Fig. 2, part C) to to deenergized, which results in opening of contacts GFb (Fig. 2, part B) in the circuit of Gen. fld. 2 and consequent reduction of the voltage generated by the armature of generator G2 to zero.

Simultaneously, brake relay BR is deenergized, opening its contacts BRd and BRe (Fig. 2, part B), and thereby permitting the brakes Brake I and Brake 2 to set.

Deenergization of directional relay RSU also causes the deenergization of motor field weakening relay coils IFW and 2FW, which results in the opening of contacts IFWc and 2FWb (Fig. 2, part B). Resistors MR6—MR8—MR9 are thereby inserted into the circuit of motor shunt fields Mtr. I sh. fld. and Mtr. 2 sh. fld. to decrease the heating of these field windings while the hoist is at rest.

The procedure above discussed has brought the right skip to the top of the furnace and the left skip to the skip pit. When the left skip is loaded, the buton LSUB (Fig. 2, part B) is depressed, causing energization of the directional relay coil LSU and the closure of its contacts LSUb and LSUd (Fig. 2, part B). This results in the energization of the directional contactors LU11, LU13, LU21 and LU23, thus closing the contacts LU11b, LU13b, LU21b and LU23b (Fig. 2, part A). The remainder of the cycle is similar to the cycle previously described in connection with the hoisting of the right skip; it being understood, of course, that contacts LS2, LS6, LS7 and LS8 in the limit switch govern the circuits in the upward travel of the left skip, since the directional relay coil LSU is energized at this time and the directional relay coil RSU is deenergized at this time.

*Normal operation of generator G1*

Generator G1 is normally operated as a constant-voltage, self-excited shunt generator to furnish general D. C. power in the blast furnace area by means of the constant-potential busses CPB+ and CPB—. In the event that generator G1 at any one of the blast furnace locations breaks down, this bus may be tied to similar busses at the other blast furnaces. It is preferable to operate with the double-pole tie circuit breaker BKR4 (Fig. 2, part A) open, so that generator G1 does not normally operate in parallel with similar machines at the other blast furnaces. However, it is permissible to operate with these machines in parallel.

For normal operation single-pole knife switch KS5 is closed upwardly; double-pole knife switch KS2 is closed upwardly to connect the armature of generator G1 to the 250-volt constant potential busses CPB+ and CPB—; and double-pole knife switch KS10 is closed upwardly for excitation of the shunt field Gen. fld. I of generator G1 through the rheostat Gen. I fld. rheo. This rheostat Gen. I fld. rheo. is adjustable and is set so that the generator G1 will deliver the required voltage. Double-pole circuit breaker BKR3 is closed to connect the field and brake control busses FBCB+ and FBCB— to the constant potential busses CPB+ and CPB—. Double-pole knife switch KS1 is left open. Double-pole circuit breaker BKR1 is closed to connect generator G1 to the 250-volt constant potential busses CPB+ and CPB—.

Operation of hoist from generator No. 1

In the event that generator G2, which normally supplies the hoist motors M1 and M2 through the hoist motor busses HMB+ and HMB—, is out of service, generator G1 may be removed from the busses CPB+ and CPB—, which it normally supplies, and used to supply the hoist motors M1 and M2 through the hoist motor busses HMB+ and HMB—. For this operation, double-pole knife switch KS2 is closed downwardly to connect generator G1 to the adjustable voltage hoist motor busses HMB+ and HMB—; double-pole knife switches KS1 and KS7 are left open; double-pole circuit breaker BKR3 is closed to connect field windings Syn. mtr. fld. of motor M3 and field and brake control busses FBCB+ and FBCB— to the 250-volt constant potential supply now obtained through the closed double-pole circuit breaker BKR4 from the tie circuit, Tie circ. Double-pole knife switch KS10 is thrown downwardly to connect the field Gen. fld. 1 of generator G1 to the field and brake control busses FBCB+ and FBCB— through resistors R5—R9. Double-pole knife switch KS11 is left open. Single-pole knife switch KS5 is closed upwardly, double-pole circuit breaker BKR1 is left open, and the double-pole circuit breaker BKR3 is closed to energize the field and brake control busses FBCB+ and FBCB— and to provide a supply for the field Syn. mtr. fld. of motor M3. The hoist will now function, supplied by generator G1.

Operation of hoist when synchronous motor or A. C. supply is not available

In the event that the synchronous motor M3 breaks down, or the A. C. supply fails, the hoist may still be kept in operation by running generator G1 as a motor to drive generator G2.

The motor-generator set M3, G1 and G2 is assembled with a generator at each end and the driving motor between. If it becomes necessary to remove the driving motor for repairs, provision may be made to connect the shafts of generator G1, operating as a motor, and generator G2. For this purpose a dummy shaft may be used in connection with the couplings Coup. 1 and Coup. 2 (Fig. 1).

For this operation, knife switches should be set as for normal two-motor operation with the following exceptions:

(1) Single-pole, double-throw knife switch KS5 is closed downwardly to include the starting equipment in the armature circuit of generator G1, now to be used as a motor.

(2) Double-pole circuit breaker BKR3 is closed to connect the field and brake control busses FBCB+ and FBCB— to the constant-potential busses CPB+ and CPB—, now supplied through the double-pole circuit breaker, BKR4, from the tie circuit, Tie circ.

(3) Double-pole knife switch KS1, for starter control is closed.

When knife switch KS1 is closed, timing relay coil 1AT (Fig. 2, part A) is energized and closes its contacts 1ATa. The starting operation is now begun by depressing the start button Start, thereby moving the contact P into bridging position. The result is energization of contactor coil 1GM (Fig. 2, part A), which provides its own holding circuit by closing of contacts 1GMa. Energization of coil 1GM also results in closure of contacts 1GMd, which completes the main circuit of armature G1, through the resistance R1—R4, thus starting the motor at a slow speed. A further result of energization of coil 1GM is the opening of normally closed contacts 1GMb, which causes timing relay 1AT to be deenergized. After a predetermined time interval, contacts 1ATb close, which results in the energization of accelerating contactor coil 1A, as contacts 1GMc are closed at this time. Closing of coil 1A causes contacts 1Ab to close the short-circuit resistance R1—R2, which results in an increase in speed of the motor. Closure of contacts 1Ab also causes timing relay coil 2AT to be deenergized. Thus, after a time interval, contacts 2ATa close, and accelerating contactor coil 2A is energized, as contacts 1Aa have closed previously. Energization of coil 2A causes contacts 2Ab to close and short-circuit resistance R2—R3, which results in the motor being further accelerated. Closure of contacts 2Ab also causes timing relay 3AT to be deenergized. Thus, after a time interval, contacts 3ATa close, and accelerating contactor coil 3A is energized, as contacts 2Aa have closed previously. Energization of coil 3A causes contacts 3Aa to close and short-circuit resistance R1—R4, which results in the motor being accelerated to the speed required for driving generator G2. This speed is determined by the setting of the generator field rheostat Gen. 1 fld. rheo., which is adjustable.

Operation of generator G2 to supply constant-potential busses

In the event that one of the blast furnaces is shut down, provision may be made to supply the constant-potential busses CPB+ and CPB— from both generators operating in parallel, if the extra capacity is needed. For this operation all the knife switches are open except as follows: Double-pole knife switches KS10 and KS11 are thrown upwardly for excitation of the fields of both generators G1 and G2 through their respective rheostats Gen. 1 fld. rheo. and gen. 2 fld. rheo. These rheostats are adjustable and are set so that the generators will deliver the required voltage and divide the load properly. Double-pole knife switch KS2 is thrown upwardly to connect the armature of generator G1 to the constant-potential busses CPB+ and CPB— through double-pole circuit breaker BKR1, which is closed. Single-pole knife switch KS5 is closed upwardly and double-pole knife switch KS7 is closed upwardly to connect the armature of generator G2 to the constant-potential busses CPB+ and CPB— through double-pole circuit breaker BKR2, which is closed. Double-pole circuit breaker BKR3 is closed to energize the field and brake control busses FBCB+ and FBCB— from the constant potential busses CPB+ and CPB—. Thus generator G1 provides excitation for the field, Syn. mtr. fld. of motor M3 and the generator fields Gen. fld. 1 and Gen. fld. 2.

Short description of actual installation

An abridged review of the instrumentalities above described will be made by a description of an arrangement which has been installed at a group of three new blast furnaces in which a single three-unit motor generator set is located at each blast furnace.

In the installation referred to, each motor generator set comprises a 600 H. P. synchronous motor driving two approximately duplicate generators corresponding, respectively, to the synchronous motor M3 and the generators G1 and G2 above described. One of these generators is rated at 250 kilowatts, 300 volts. This generator supplies adjustable voltage for the two motors driving the skip hoist, which two motors have been indicated hereinabove by the characters M1 and M2. The other generator is rated at 200 kilowatts, 240 volts. A generator rated at 250 kilowatts at 300 volts will have a current rating of $$\frac{250 \times 1000}{300} = 833.33 \text{ amperes}$$

If such a generator is operated at 240 volts, its capacity is $$\frac{240 \times 833.33}{1000} = 200 \text{ kilowatts}$$

In other words, generators G—1 and G—2 are of approximately equal capacity. This generator supplies the constant potential direct current service to the scale car, cranes, and other auxiliary drives about the furnace.

The general scheme of connections is illustrated in Figure 1, which shows the arrangement for a plurality of furnace installations, the showing being in single-line schematic manner. Figure 1 illustrates two blast furnace installations connected by the tie circuit Tie circ. Any number of blast furnace installations may be connected to said tie circuit. Under normal operation generator G2 at each blast furnace will be connected to the corresponding hoist motor busses HMB+ and HMB— and will supply adjustable voltage to the hoist motors M1 and M2 forming part of that particular blast furnace installation.

As illustrated in Figure 2, part B, and in Figure 4, the field windings of this generator are controlled by resistors R5—R9 and by relays GFb, GF1c, GF2a and GF3d. Under the normal conditions referred to, the generator G1 will be connected to the constant voltage busses CPB+ and CPB—. Thus generator G1 will furnish the excitation for the fields of all the machines. The brakes are also fed from this circuit. A number of feeders are provided to supply auxiliary motors in the local furnace area. The voltage of generator G1 is controlled by a hand rheostat.

In the event that a fault should develop in the direct-current generator G2, the transfer switch KS2 may be thrown to connect generator G1 to the adjustable voltage hoist motor busses HMB+ and HMB—. The generator field transfer switch KS10 is also thrown so that the fields of generator G1 are controlled by resistors R5—R9 and by the relays GFb, GF1c, GF2a and GF3d. Generator G1 can then serve as a full replacement for generator G2. Two alternative sources of adjustable voltage for the hoist motors are thus afforded.

If generator G1 should be employed to supply adjustable voltage, it will be necessary to provide some other source of constant-potential direct-current. This is done by means of the tie circuit, Tie circ., to which the constant-voltage busses CPB+ and CPB— at all of the blast furnace installations may be connected. The tie circuit is extended to a nearby substation which can supplement the direct-current interchanged between the blast furnace installations, if need be.

The direct-current unit G1 is also provided with a resistor bank and starting contactors, the combination of said resistor bank and starting contactors being represented by the word "Starter" in Figures 1 and 4. In Figure 2, part A, the resistors forming part of this starter are shown as R1—R2—R3—R4 and the contactors (coils) of said starter are shown as 1A, 2A, 3A and 1GM. The unit G1 may then be employed to drive the generator G2. Generator 2 then functions in its normal manner to supply adjustable voltage to the hoist motors M1 and M2. This arrangement protects against the contingency of a fault in the synchronous motor M3, or in the alternating current supply line, or in the switching.

To permit the synchronous motor M3 to be removed for repairs, if need be, a spare section of dummy shaft (not illustrated) may be provided. This dummy shaft replaces the motor M3, being connected to the shafts of the generators G1, G2, by means of the couplings Coup. 1 and Coup. 2 (Fig. 1).

Another combination may be described as follows: The two generators G1 and G2 may both be connected to the constant-potential busses CPB+ and CPB—. Such an arrangement is feasible if the blast furnace with which these units are associated is shut down. For example, if the motor M3 at furnace No. 1 (Fig. 1) is out of service, the generator G1 at that furnace may act as a motor to drive the generator G2 which will serve the skip hoist at that furnace. To supply the direct-current to the unit G1 at the furnace No. 1, the generators G1 and G2 at blast furnace No. 2 may deliver constant voltage to the tie circuit Tie circ. The combination just described is well adapted to conditions at certain plants. It insures continuity of operation through duplication of facilities without the installation of any idle reserve equipment.

The term skip hoist control as used in this specification is intended to be sufficiently broad to cover the hoist drum means, the motive means for applying mechanical power to said drum means, the motor generator sets, and the control assemblies therefor.

Though a preferred embodiment of the present invention has been described in detail, many modifications will occur to those skilled in the art. It is intended to cover all such modifications that fall within the scope of the appended claims.

What is claimed is:

1. In a skip hoist control, in combination, a driving motor and a pair of direct current generators adapted to be driven by said motor, a skip hoist embodying motive means adapted to be supplied with current from one of said generators, means for adjusting the voltage of said one generator for controlling the speed of said skip hoist, means for providing constant voltage at the terminals of the other of said generators, and means operative alternatively with said first mentioned adjusting means for regulating the voltage of said one generator to provide constant voltage at its terminals.

2. In combination, a plurality of skip hoists each including motive means and each adapted to operate the skip mechanism at a corresponding location, a plurality of motor generator sets each adapted to supply the motive means at a corresponding one of said skip hoists, each of said motor generator sets comprising a driving motor and a pair of generators of approximately equal capacity adapted to be driven by said motor, a plurality of hoist motor bus means each adapted to be supplied by one of the generators at a corresponding location, means for adjusting the voltage applied by said one generator to its corresponding bus means at each of said locations for adjusting the speed of its corresponding hoist, a plurality of constant potential bus means each adapted to be supplied by the other generator at a corresponding location, means for maintaining substantially constant the voltage applied by said other generator to its corresponding bus means at each of said locations and means for transferring power at substantially constant voltage from the constant potential bus means at any of said locations to the other constant potential bus means at any of the other of said locations.

3. In combination, a plurality of skip hoists each including motive means and each adapted to operate the skip mechanism at a corresponding location, a plurality of motor generator sets each adapted to supply the motive means at a corresponding one of said skip hoists, each of said motor generator sets comprising a driving motor and a pair of generators adapted to be driven by said motor, a plurality of hoist motor bus means each adapted to be supplied by one of the generators at a corresponding location, means for adjusting the voltage applied by said one generator to its corresponding bus means at each of said locations for adjusting the speed of its corresponding hoist, a plurality of constant potential bus means each adapted to be supplied by the other generator at a corresponding location, means for maintaining substantially constant the voltage applied by said other generator to its corresponding bus means at each of said locations, and a tie circuit for connecting the constant potential bus means at said plurality of motor generator sets.

4. In combination, a plurality of skip hoists, each including motive means and each adapted to operate the skip mechanism at a corresponding location, a plurality of motor generator sets each adapted to supply the motive means at a corresponding one of said skip hoists, each of said motor generator sets comprising a driving motor and a pair of generators of approximately equal capacity adapted to be driven by said motor, a plurality of hoist motor bus means each adapted to be supplied by one of the generators at a corresponding hoist, means for adjusting the voltage applied by said one generator to its corresponding bus means at each of said hoists for controlling the speed of its corresponding hoist, constant potential bus means each adapted to be supplied by the other generator at a corresponding hoist, means for maintaining substantially constant the voltage applied by said other generator to its corresponding bus means at each of said hoists, and a tie circuit for connecting the constant potential bus means at said plurality of motor generator sets, one of said generators at each of said hoists being adapted to operate as a motor to drive the other of said generators to supply the power for driving its corresponding hoist.

5. In combination, a plurality of motor generator sets, each including a driving motor and a pair of generators driven by said driving motor, constant potential bus means at each of said sets adapted to be supplied with constant potential by one of the generators at its corresponding set, a tie circuit for connecting together the constant potential bus means at said sets, the other generator at each of said sets having its own individual control means for adjusting the voltage delivered thereby whereby to control the speed of a motor supplied therefrom, one of the generators at each of said sets being adapted to be operated as a motor to drive the other generator at its corresponding set.

6. In a skip hoist control, in combination, a motor generator set comprising a driving motor and two generators adapted to be driven by said motor, switching mechanism for alternatively connecting either of said generators to motive means for a skip hoist for driving the skip mechanism of a blast furnace, control means responsive to said skip hoist for adjusting the voltage of one of said generators, switch mechanism for connecting said control means selectively to either of said generators, and means for maintaining substantially constant voltage on the other of said generators.

7. In a skip hoist control, in combination, a motor generator set comprising a driving motor and two generators adapted to be driven by said motor, switching mechanism for alternatively connecting either of said generators to motive means for a skip hoist for driving the skip mechanism of a blast furnace, control means responsive to said skip hoist for adjusting the voltage of one of said generators, switch mechanism for connecting said control means selectively to either of said generators, and means for maintaining substantially constant voltage on the other of said generators, said driving motor being removable, the rotors of said two generators being adapted to be connected together whereby one of said generators may operate as a motor for driving the other of said generators.

8. In a skip hoist control, in combination, a motor generator set including a driving motor and two generators adapted to be driven by said motor, means for adjusting the voltage developed by one of said generators according to a predetermined plan, means for maintaining a constant voltage from the other of said generators, and switch means adapted to connect either of said generators to said adjusting means whereby either of said generators may be controlled by said adjusting means to develop adjustable voltage.

9. In a skip hoist control, in combination, a motor generator set including a driving motor and two generators adapted to be driven by said motor, means for adjusting the voltage developed by one of said generators according to a predetermined plan, means for maintaining a constant voltage at each of said generators, and switch means adapted to connect either or both of said generators alternatively to said voltage adjusting means or to said constant voltage maintaining means whereby either or both of said generators may be controlled to maintain constant voltage.

10. In a skip hoist control, in combination, a motor generator set including a driving motor and two generators adapted to be driven by said motor, means for adjusting the voltage developed by one of said generators according to a predetermined plan, means for maintaining a constant voltage developed by the other of said generators, and switch means whereby one of said generators may be operated as a motor to drive the other of said generators as a generator.

11. In a skip hoist control, in combination, a motor generator set including a driving motor and two generators adapted to be driven by said motor, means for adjusting the voltage developed by one of said generators according to a predetermined plan, switch means adapted to connect said voltage adjusting means to either of said generators, bus means adapted to be supplied by the generator which responds to said voltage adjusting means, means for maintaining a constant voltage developed by said generators, switch means adapted to connect said voltage maintaining means to either or to both of said generators, bus means adapted to be supplied at constant voltage, and switch means for connecting either of said generators to said first mentioned bus means or for connecting either or both of said generators to said second mentioned bus means.

12. In a skip hoist control, in combination, a motor generator set comprising a driving motor and two generators adapted to be driven by said motor, switching mechanism for alternatively connecting either of said generators to motive means for a skip hoist for driving the skip mechanism of a blast furnace, control means responsive to said skip hoist for adjusting the voltage of one of said generators, and switch mechanism for connecting said control means selectively to either of said generators.

13. In a skip hoist control, in combination, a motor generator set including a driving motor and two generators of approximately equal capacity adapted to be driven by said motor, means for adjusting the voltage developed by one of said generators according to a predetermined plan, means for maintaining a constant voltage developed by the other of said generators, and switch means whereby one of said generators may be operated as a motor to drive the other of said generators as a generator.

14. In a skip hoist control, in combination, a skip hoist including motive means therefor, a motor generator set including a driving motor and two generators adapted to be driven by said motor, either of said generators being of a capacity sufficient to supply said motive means for normal operation of said hoist, means for adjusting the voltage developed by one of said generators according to a predetermined plan, means for maintaining a constant voltage developed by the other of said generators, and switch means whereby one of said generators may be operated as a motor to drive the other of said generators as a generator.

15. In a skip hoist control, in combination, a skip hoist including motive means therefor, a motor generator set including a driving motor and two generators adapted to be driven by said motor, either of said generators being of a capacity sufficient to supply said motive means for normal operation of said hoist, switching mechanism for alternatively connecting either of said generators to motive means for a skip hoist for driving the skip mechanism of a blast furnace, control means responsive to said skip hoist for adjusting the voltage of one of said generators, and switch mechanism for connecting said control means selectively to either of said generators.

16. In a skip hoist control, in combination, a skip hoist including motive means therefor, a motor generator set including a driving motor and two generators adapted to be driven by said motor, either of said generators being of a capacity sufficient to supply said motive means for normal operation of said hoist, switching mechanism for alternatively connecting either of said generators to said motive means, control means responsive to said skip hoist for adjusting the voltage of one of said generators according to a predetermined plan and other control means for defining a generally constant voltage developed by the other of said generators, means for establishing connections so that either of said generators may be chosen as the adjustable voltage generator for supplying current to said hoist motive means while the other of said generators is chosen to develop generally constant voltage.

17. A skip hoist embodying, in combination, two hoist motors, a motor generator set comprising a driving motor and two generators, either of which is of sufficient capacity to supply said two hoist motors in normal operation, switching means for connecting one of said generators alternatively to supply said hoist motors or to supply constant potential requirements in connection with said hoist and control means responsive to said skip hoist for adjusting the voltage of the generator connected to supply said hoist motors according to a predetermined plan, and other control means for defining the voltage of the generator connected to supply said constant potential requirements.

18. A skip hoist embodying, in combination, motive means, a motor generator set comprising a driving motor and two generators adapted to be driven by said motor, switching mechanism for alternatively connecting either of said generators to supply said motive means and control means responsive to said skip hoist for adjusting the voltage of one of said generators according to a predetermined plan and other control means for defining a generally constant voltage developed by the other of said generators and means for modifying the connections so that the voltage of the generator connected to supply said motive means is adjusted according to said predetermined plan.

19. In a skip hoist drive, in combination, a hoist motive means having instrumentalities requiring current at substantially constant voltage, a motor generator set including a driving motor and two generators adapted to be driven by said driving motor, either of said generators being adapted to supply said hoist motive means, means responsive to said hoist motive means for varying the voltage of one of said generators, means for connecting the armature of said one generator to said hoist motive means, means for maintaining a substantially constant voltage from the other of said generators, means for connecting said other generator to supply the constant voltage requirements of said hoist drive, means for alternatively connecting the armature of said other generator to said hoist motive means and for varying its voltage responsive to said hoist motive means and means for supplying the constant potential requirements of said hoist drive from another source.

GORDON FOX.

REFERENCES CITED

The following references are of record in the file of this patent:

UNITED STATES PATENTS

| Number | Name | Date |
| --- | --- | --- |
| 2,147,062 | Rosener | Feb. 14, 1939 |
| 2,379,958 | Fox | July 10, 1945 |